United States Patent [19]

Rahn

[11] Patent Number: 4,559,517

[45] Date of Patent: Dec. 17, 1985

[54] WARNING SYSTEM FOR SCHOOL BUSES

[76] Inventor: Raymond A. Rahn, 22125 Albatross, Farmington, Minn. 55024

[21] Appl. No.: 522,517

[22] Filed: Aug. 12, 1983

[51] Int. Cl.⁴ .............................................. B60Q 1/00
[52] U.S. Cl. ........................................ 340/75; 340/88; 340/326
[58] Field of Search .................. 340/925, 944, 75, 88, 340/326, 815, 21, 74, 72, 81 R, 84, 87, 106, 107, 108, 110; 362/293; 40/564, 574, 575, 577, 572

[56] References Cited

U.S. PATENT DOCUMENTS

| | | | |
|---|---|---|---|
| 2,400,655 | 5/1946 | Saia ..................................... | 340/107 |
| 3,491,336 | 1/1970 | Anderson ............................. | 340/84 |
| 3,786,498 | 1/1974 | Lipe et al. ............................ | 340/75 |
| 3,838,392 | 9/1974 | Lockwood et al. .................. | 340/75 |

Primary Examiner—John W. Caldwell, Sr.
Assistant Examiner—Jeffery A. Brier
Attorney, Agent, or Firm—Donald A. Jacobson

[57] ABSTRACT

A warning system to be mounted on the front exterior of a school bus to provide two signals to the passengers. One signal is a flashing red light accompanied by an intermittent horn and the second is a steady green light both of which can be seen and heard by children boarding or leaving the bus on both sides of the street to tell them whether it is unsafe or safe to cross the road. This warning system is controlled by the driver allowing him to direct the children safely across the street.

4 Claims, 4 Drawing Figures

U.S. Patent    Dec. 17, 1985    4,559,517
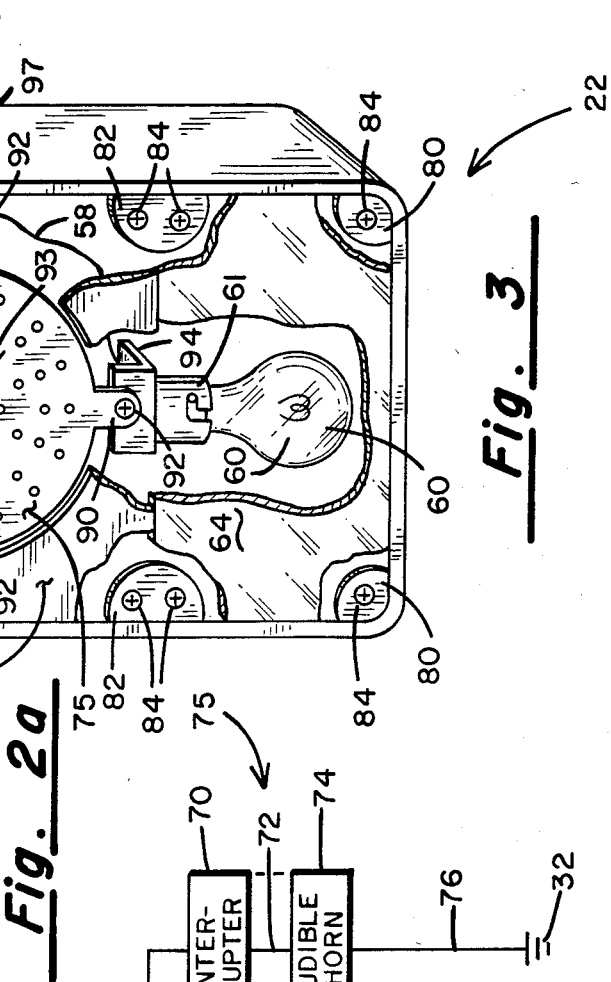
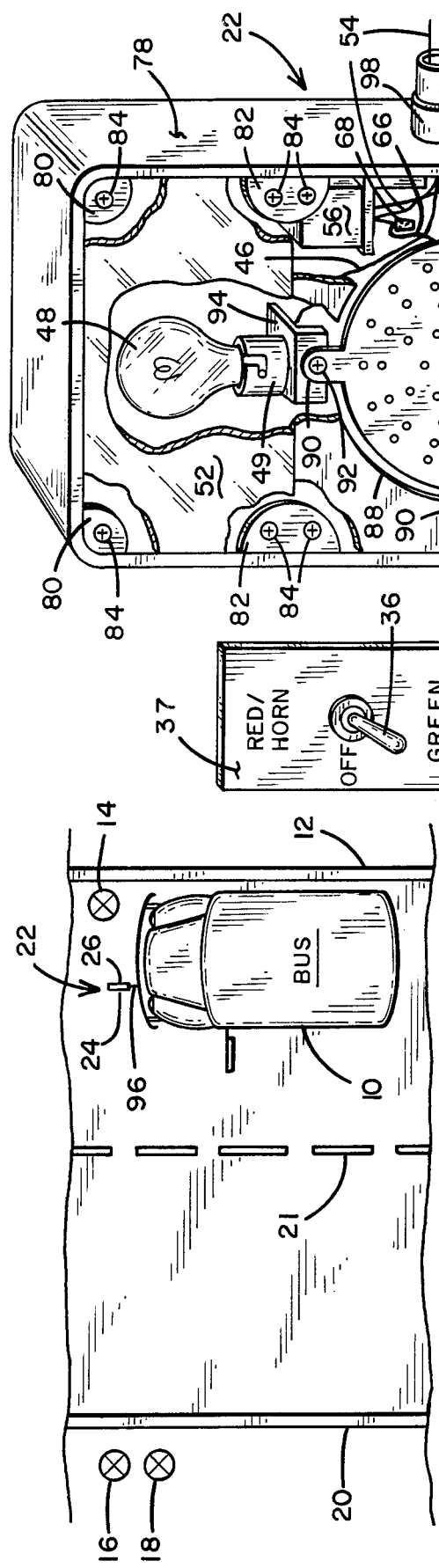
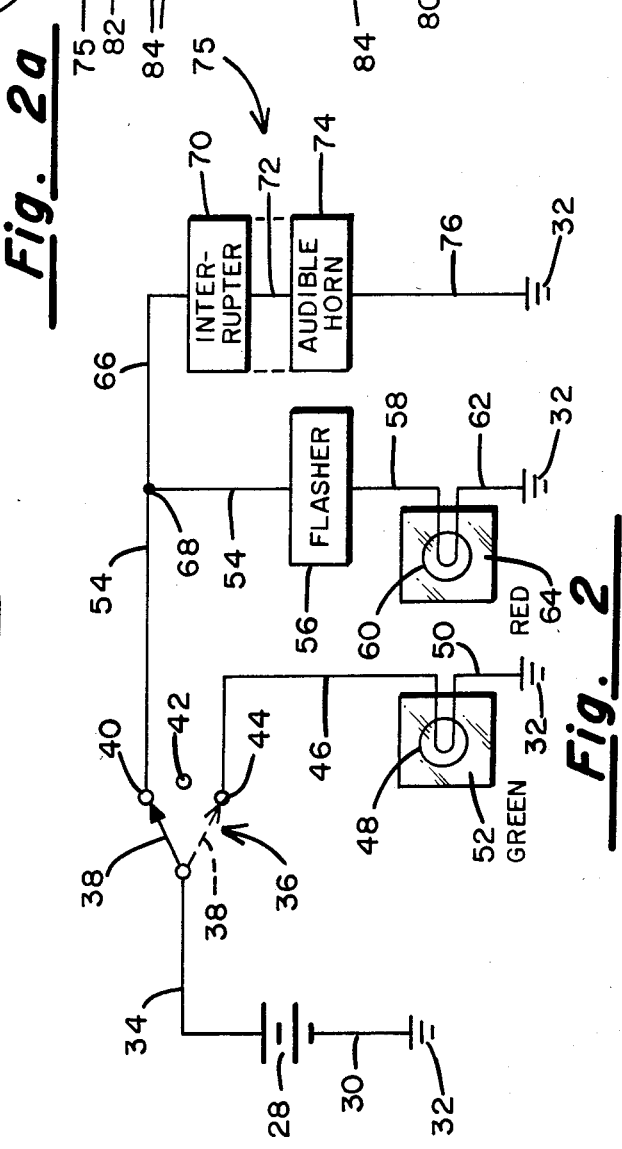

WARNING SYSTEM FOR SCHOOL BUSES

BACKGROUND OF THE INVENTION

I. Field of the Invention

This invention relates generally to apparatus which will provide both an audible and visual indication to children whether it is safe or unsafe to cross a street to board or to exit a school bus. The apparatus is under full control of the driver who is in a position to readily observe the flow of traffic and by means of this device can easily communicate with the children using a horn as a warning and different colored lights to signal whether it is either safe or unsafe to cross the street.

II. Description of the Prior Art

There is disclosed in the prior art a number of devices for providing a warning using audible or visual signals on the exterior of vehicles which are controlled either directly or indirectly by the operator. For example, reference is made to Lockwood, et al., U.S. Pat. No. 3,838,392 where an audible warning system is automatically activated in response to closing the door of a school bus preparatory to movement of the bus away from the stop. In addition as the school bus nears a bus stop, the operator can activate an external yellow warning light system which automatically changes to a red light warning system while the bus is stopped. The audible alarm is automatically activated by closing the bus door. In Reed, U.S. Pat. No. 1,538,491 a motor vehicle signal device mounted on the exterior of a vehicle comprising a box containing a light bulb, the box having an outwardly facing translucent portion with a message formed in contrasting color letters. In Saia, U.S. Pat. No. 2,400,655 a motor vehicle signal device mounted on the exterior of a vehicle comprising a box containing a light bult, the box having a transparent portion on an outer surface formed into the word 'Pass'. Two of these boxes are used, one mounted on the front end and the other on the rear of a vehicle to permit the driver to indicate his willingness to be passed by another vehicle by turning the light bulbs on by means of a switch. In Anderson, U.S. Pat. No. 3,491,336 a motor vehicle signal switch device having an exterior chamber containing a light bulb is mounted on the front of a vehicle. A series of openings in the chamber are formed such as to spell out the words 'Brake Light'. The light bulb is activated whenever the brakes are set to automatically let pedestrians know that the vehicle is decelerating.

None of these devices address the instant problem of warning children whether it is safe or unsafe to cross the street to or from a bus. There is an ability to communicate with people exterior to the vehicle using the lights and alarms but the purposes all differ from the instant invention with a resulting difference in operating principles, mechanization and construction.

SUMMARY OF THE PRESENT INVENTION

A child is exposed to a great deal of danger when he must cross the street to board a school bus. Younger children in particular are oblivious to these dangers and many are injured or killed each school year in tragic accidents. The purpose of this invention is to permit the driver, who is in a position to observe oncoming traffic, to signal to children both when it is safe as well as when it is unsafe to cross the street.

A device mounted on the front of the school bus having two opposed pairs of translucent areas one pair being red and one pair being green, which are visible from either side of the street with a light bulb mounted between each respective colored pairs of translucent areas to provide a visible signal means. A switch for each light bulb which is controlled by the driver permits signaling the children whether they should or should not cross the street using the same conventions for colors as those of a traffic signal. An audible alarm connected in parallel with the light bulb which illuminates the red translucent panels provides an audible warning in addition to the red light. This combination ensures that the students will be aware that the red light is on and they should not cross the street. When the green light is on the children are aware that they can cross the street. This combination of signals is simple yet effective and can be explained readily to even the youngest student.

This communication system places the students crossing the street under the control of the driver who is in a superior position to observe highway conditions and, in addition, is a mature individual.

BRIEF DESCRIPTION OF THE DRAWINGS

FIG. 1 is a top view of a bus with respect to a portion of a roadway.

FIG. 2 is an electric circuit diagram of the device.

FIG. 2a is a front view of the controlling switch and mounting plate.

FIG. 3 is an isometric side view of the device as mounted on the bus with a number of cut-outs in the front face to reveal inner construction.

DETAILED DESCRIPTION OF THE PREFERRED EMBODIMENTS

Referring first to FIG. 1, a bus 10 is shown on a street parked at a right hand curb 12. A child 14 represented by a circle is adjacent curb 12 and two other children 16 and 18, also represented by circles, are adjacent left hand curb 20. A dashed center line 21 indicates the street center. The warning device signal unit 22 is mounted on the front of the bus. Left side 24 and right side 26 of device 22 each have red and green translucent opposing panels to be described later. These opposing pairs of panels of the same color are illuminated in pairs by one light bulb as described later. This provides a means of selecting one of two colors of light which can be seen by children 14, 16, and 18 on both sides of the street at the same time.

Referring to FIG. 2 the circuit diagram of the device can be seen. A bus battery 28 is connected by a ground wire 30 to the grounded frame of the bus represented by a ground symbol 32. Wire 34 connects battery 28 to a three position single pole switch 36 at the switch selector arm 38. Switch 36 has three selector contacts 40, 42, and 44 opposing selector arm 38.

Wire 46 connects contact 44 to an incandescent lamp 48 which is in turn connected to bus ground 32 by a wire 50. A green plastic translucent panel 52 over lamp 48, indicated here by a square, provides the desired color. Wire 54 connects contact 40 to a flasher 56 and wire 58 connects the flasher to an incandescent lamp 60. Wire 62 connects lamp 60 to bus ground 32. Flasher 56 is a conventional circuit interruptor which automatically first opens the circuit after current has been on for a short time interval and then closes the circuit after a second short time interval to provide a nominally equal on-off duty cycle to control the operation of lamp 60. A red plastic translucent panel 64 over lamp 60, indicated here by a square, provides the desired color. Wire 66 is connected from wire 54 at junction 68 to an interrupter 70. Interrupter 70 is essentially the same type of circuit as flasher 56 in that it also automatically opens the circuit after current has been flowing for a short time and recloses the circuit after the current has been interrupted for a short time to also provide a nominally equal on-off duty cycle. Wire 72 connects interruptor 70 to an electric horn 74 and wire 76 connects the horn to bus ground 32. Dashed lines are shown connecting interruptor 70 with audible horn 74 to indicate that these electrical components are physically mounted within one enclosure 75.

When the circuit has arm 38 connected to contact 40, as shown in FIG. 2, lamp 60 will flash and horn 74 will sound intermittently. When arm 38 is connected to contact 42 the signal unit will be off and when arm 38 is connected to contact 44 lamp 48 will burn continuously. In FIG. 2a switch 36 is shown with labels on a mounting plate 37 for the various positions of arm 38 corresponding to the circuit connections of FIG. 2. Mounting plate 37 is placed on the dashboard of the bus within easy reach of the driver.

In FIG. 3 the mechanical arrangement of signal unit 22 is shown. An outer metal frame 78 open on the front and back has four tabs 80 in each corner in the form of a quarter circle in the same plane as the outer edge of the frame. Four equally spaced tabs 82 in the form of semi-circles are mounted between and in the same plane as tabs 80.

Green translucent panel 52 and red translucent panel 64 have four holes, one in each corner, which are of the same size and aligned with matching holes in tabs 80 and 82. Panels 52 and 64 are mounted in place on frame 78 using bolts 84 with matching nuts, not shown, through the panels and tabs 80 and 82.

A metal panel 86 with a circular center hole 88 has a combined interrupter and horn 75 mounted within hole 88 on four extensions 90 extending at ninety degree intervals from the interrupter and horn, by means of bolts 92 through equal size aligned holes in extensions 90 and panel 86 and secured by nuts, not shown. Hole 88 through panel 86 is slightly larger than the circular shaped main body of interrupter and horn 75 but smaller than the circle defined by the holes receiving bolts 92 in panel 86. Holes 93 in combined interrupter and horn unit 75 provide a path for accoustic energy. Lamp sockets 49 and 61 are each mounted upon a right angle bracket 94. Brackets 94 have a first leg in the plane of tabs 80 and 82 extending beyond bolts 92 and a right angle bend perpendicular to this plane into frame 78 such that the second leg of the brackets are parallel to the side of frame 78 having the smallest dimensions and extending beyond the center of frame 78 such that lamp sockets 49 and 61 are held approximately midway between the open sides of said frame. Brackets 94 are also secured by bolts 92 which extend first through frame 78 and then through proper sized aligned matching holes, not shown, in the brackets.

The opposite face of signal unit 22, not shown, uses an identical construction for the outer frame, having the same tabs in the same relative locations attached in the same manner with holes for bolts of the same size at the same location. Identical red and green translucent panels are attached in the same manner with the green translucent panel uppermost opposite green translucent panel 52 and the red translucent panel lowermost opposite red translucent panel 64. A metal panel having the same dimensions as panel 86 is mounted in the same manner in the same relative location on the opposite face of signal unit 22. This opposing metal panel does not have a single hole in its center but instead has a number of holes of the same general size and location relative to the panel as holes 93 in panel 86 to provide a path for acoustic energy on this opposite side.

A metal electrical condiut 96 is secured through a hole 97 in frame 78 using a conventional conduit connector 98. Wire 54 through conduit 96 is connected to wire 66 by a wirenut to form junction 68. Wire 66 is connected on its opposite end to interrupter and horn 75. Wire 58 completes the circuit from flasher 56 to lamp socket 61 which is the receptacle for lamp 60. Wire 46 through condiut 96 is connected to lamp socket 49 which is the receptacle for lamp 48. Wires 54 and 46 are connected to switch contacts 40 and 44 (FIG. 2) respectively at their opposite ends. Conduit 96 secures signal unit to bus 10 as shown in FIG. 1, through a matching hole in the front of bus 10 and conduit connector, not shown. The return circuit path for lamps 48 and 60 and interrupter horn 73 is through the metal case of signal unit 22 and conduit 96 to the bus ground.

Colored green translucent panel 52 and red translucent panel 64 in FIG. 3 are mounted on frame 78 directly opposite the same color panels on the opposite side such that lamp 48 will illuminate both green panels simultaneously and lamp 60 illuminate both red panels simultaneously.

With these electrical connections and mechanical arrangement when switch 36 is placed in the upper position as shown in FIG. 2a thereby connecting arm 38 to contact 40, as shown in FIG. 2, which will energize lamp 60 interrupter and horn 73, lamp 60 will flash intermittently due to the action of flasher unit 56 and horn 74 will sound intermittently due to the action of interrupter 70. The color of lamp 60 when viewed from both sides 24 and 26 of signal unit 22 as shown in FIG. 1 will be red. When switch 36, as shown in FIG. 2a, is placed in the center position, arm 38 is connected to contact 42 and signal unit 22 will be off. When switch 36 is placed in the down position, as shown in FIG. 2a, thereby connecting arm 38 to contact 44 as shown in dashed lines in FIG. 2a, thereby connecting arm 38 to contact 44, lamp 48 will be continuously energized. Lamp 48 will shine continuously as long as switch arm 38 remains in this position. The color of lamp 48 when viewed from both sides 24 and 26 of signal unit 22, as shown in FIG. 1, will be green. Switch 36 is mounted on the dashboard of bus 10 in a location which can be reached conveniently by the driver.

In use, the bus will be at the curb as shown in FIG. 1. Switch 36, shown in FIG. 2a, will be in the center off position except when the bus is stopped and children approaching the street to cross. At this time the driver is in a position to observe if there is any potential traffic hazard and if there is will place switch arm 38 in the upper portion, as shown in FIG. 2a, to energize the upper flashing red light 60 and the interrupter horn unit 75 shown in FIGS. 2 and 3. This combination flashing red light can be seen by children 14, 16, and 18 on both sides of the road in FIG. 1 and will warn them not to cross the road. When the hazard has passed or the other vehicle stopped the driver will place switch arm 38 in the lower position as shown in FIG. 2a to continuously energize green light 48 shown in FIGS. 2 and 3. This green light will inform the children that it is now safe to cross the road. This system is used when children are picked up and when children are dropped off to inform them whether it is safe or unsafe to cross the road to or from the bus to their homes.

This warning system is easy to operate and to explain to school children. The red stop and green go lights use the same colors for the same message as a conventional traffic signal. The addition of the flashing red light and intermittent horn provides additional assurance that the danger signals will not be ignored.

This system effectively gives the driver control of the childrens' street crossing by permitting him to signal whether or not to cross the road to the children. Since the driver has both a better view of the road and superior judgment this control will result in greatly improved safety for the children with a resulting decrease in accidents.

While frame 78 and panel 86 have been described as made of metal a number of plastics or other dimensionally stable materials could be used as well. Likewise, while translucent panels 52 and 64 have been described as made of plastic, glass could be used as well.

Although these and other specific constructions of the hereindisclosed materials and warning system habe been shown and described, it is obvious that those skilled in the art may make various modifications and changes to them without departing from the spirit and scope of the instant invention. It is to be expressly understood that the instant invention is limited only by the appended claims.

What is claimed is:

1. An electrical warning device for a vehicle to signal arriving and departing passengers of existing traffic conditions, comprising:

(a) an elongated open frame having two opposed open sides with each said open side covered by three panels, the first panel on each side being made of a translucent material of a first color and covering approximately one-third of said open side from one end of the elongated dimension of said frame towards the center, the second panel on each side being made from a translucent material of a color different from said first color and covering approximately one-third of said open side from the opposite end of said elongated dimension of said frame towards the center, and a third panel on each side made from an opaque material and covering the remainder of said open side, at least one of said third panels on each side having holes therethrough for transmitting acoustic energies;

(b) a first and a second electrically-powered light source contained within said frame, said first light source being positioned within said frame to show through said first translucent panels on each side and said second light source being positioned within said frame to show through said second translucent panels on each side, said second light source having an automatic circuit interrupter connected in series therewith in a first electrical series circuit; and (c) an audible electric horn having an electric circuit interrupter connected in series circuit therewith in a second electrical series circuit and contained within said frame between said third panels, with said first and said second electrical series circuits connected together in a parallel electrical circuit; and (d) a source of electrical power; and (e) switch means coupling said source of electrical power alternately to said first light source or to said parallel electrical circuit.

2. An electrical warning system as in claim 1, wherein said energizing means includes the battery of said vehicle and said switching means comprises a multi-pole switch having an arm and at least three contacts with said arm connected to said battery and a first contact connected to a parallel electrical circuit having a first branch being said series circuit of said interrupter and a first incandescent bulb with said first branch terminating at the ground system of said vehicle, and a second branch being said series circuit of said electric horn and said electric circuit interrupter, said second branch terminating at said ground system, an open second contact and a third contact of said switch being connected to a circuit consisting of a second incandescent bulb and terminating at said ground system.

3. The electrical warning device as in claim 1 wherein said frame has a generally rectangular shape and generally rectangular shaped open sides with mounting tabs at the corner of each said panel said tabs being in the outer planes of said frame.

4. An electrical warning device as in claim 2, and further comprising a mounting plate for said multi-pole switch having labels for each position consisting of the label RED/HORN when the arm is connected to said first contact, OFF when the arm is connected to said second contact and GREEN when the arm is connected to said third contact.

* * * * *